(12) United States Patent
Overend et al.

(10) Patent No.: US 10,815,341 B2
(45) Date of Patent: Oct. 27, 2020

(54) POLYMERIC MATERIALS

(71) Applicant: Colormatrix Holdings, Inc., Wilmington, DE (US)

(72) Inventors: Andrew Overend, Bolton (GB); David Loftus, Formby (GB); Philip Winrow, Ormskirk (GB); Chun Yee Lew, Liverpool (GB)

(73) Assignee: COLORMATRIX HOLDINGS, INC., Wilmington, DE (US)

( * ) Notice: Subject to any disclaimer, the term of this patent is extended or adjusted under 35 U.S.C. 154(b) by 221 days.

(21) Appl. No.: 15/761,850

(22) PCT Filed: Sep. 16, 2016

(86) PCT No.: PCT/IB2016/055521
§ 371 (c)(1),
(2) Date: Mar. 21, 2018

(87) PCT Pub. No.: WO2017/051291
PCT Pub. Date: Mar. 30, 2017

(65) Prior Publication Data
US 2018/0230275 A1    Aug. 16, 2018

(30) Foreign Application Priority Data
Sep. 21, 2015    (GB) .................................. 1516679.6

(51) Int. Cl.
| | | |
|---|---|---|
| C08J 3/20 | (2006.01) | |
| C08J 3/205 | (2006.01) | |
| D01F 1/10 | (2006.01) | |
| C08K 5/12 | (2006.01) | |
| C08L 67/04 | (2006.01) | |
| C08L 77/02 | (2006.01) | |
| D01F 6/62 | (2006.01) | |
| C08K 3/04 | (2006.01) | |
| C08K 5/3412 | (2006.01) | |

(52) U.S. Cl.
CPC .............. *C08J 3/2056* (2013.01); *C08K 5/12* (2013.01); *C08L 67/04* (2013.01); *C08L 77/02* (2013.01); *D01F 1/10* (2013.01); *C08J 2367/02* (2013.01); *C08K 3/04* (2013.01); *C08K 5/3412* (2013.01); *C08L 2203/12* (2013.01); *D01F 6/62* (2013.01)

(58) Field of Classification Search
CPC .......... C08J 3/2056; C08K 5/12; C08L 67/04; C08L 77/02
See application file for complete search history.

(56) References Cited

U.S. PATENT DOCUMENTS

| | | |
|---|---|---|
| 6,228,980 B1 | 5/2001 | Loontjens et al. |
| 2007/0224377 A1 | 9/2007 | Leimbacher et al. |
| 2013/0137344 A1 | 5/2013 | Liu et al. |

FOREIGN PATENT DOCUMENTS

| | | |
|---|---|---|
| CN | 102586933 A | 7/2012 |
| JP | 2006-233391 A | 9/2006 |
| KR | 10-2014-0091868 A | 7/2014 |
| WO | 98/47940 A1 | 10/1998 |
| WO | 00/17169 A1 | 3/2000 |
| WO | 03/061722 A2 | 7/2003 |
| WO | 2006/094315 A2 | 9/2006 |
| WO | 2008/095071 A1 | 8/2008 |
| WO | 2012/085548 A2 | 6/2012 |
| WO | 2014001996 A1 | 1/2014 |
| WO | 2016083326 A1 | 6/2016 |

OTHER PUBLICATIONS

International Search Report of corresponding application No. PCT/IB2016/055521, dated Dec. 19, 2016.
GB Search Report of corresponding application No. 1516679.6, dated Oct. 16, 2016.
GB Search Report of corresponding application No. 1516679.6, dated Mar. 22, 2016.

*Primary Examiner* — Edward J Cain
(74) *Attorney, Agent, or Firm* — Fay Sharpe LLP

(57) ABSTRACT

A liquid formulation for addition to a polymeric material comprises a vehicle, an additive (e.g. a colourant) and carbonyl bis (1-caprolactan)). The liquid formulation may be used to colour melt spun fibre (e.g. PET or polyamide).

19 Claims, 1 Drawing Sheet

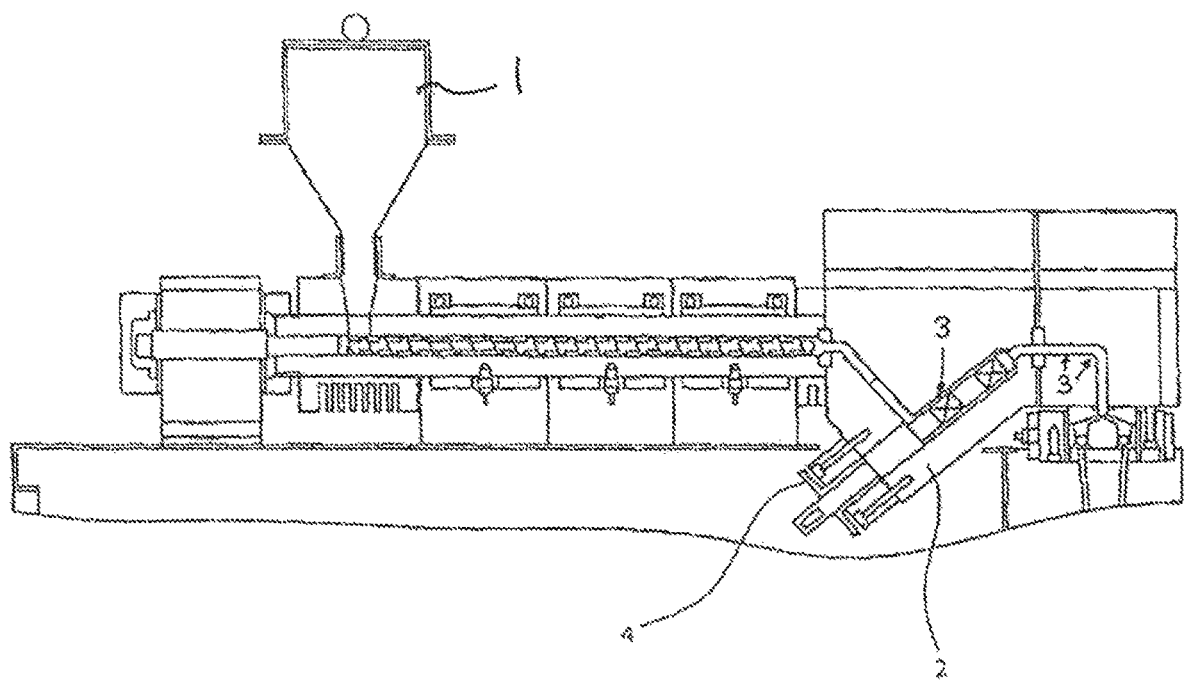

POLYMERIC MATERIALS

This application is the U.S. National Stage application under 35 U.S.C. § 371 of International Application No. PCT/IB2016/055521, filed Sep. 16, 2016, published as WO 2017/051291 A1 on Mar. 30, 2017, which claims the benefit of GB Patent Application Number 1516679.6, filed Sep. 21, 2015. These applications are hereby incorporated by reference herein.

This invention relates to polymeric materials and particularly, although not exclusively, relates to incorporation of additives, for example colourants, into polymeric materials using a liquid formulation.

It is known to use liquid formulations to introduce additives into polymeric materials. Such formulations may comprise one or more liquid vehicles together with one or more additives, for example colourants. However, in some cases, known liquids formulations have a detrimental effect on the properties of the polymeric material which is treated with the liquid formulation. For example, when a liquid formulation is used to colour melt spun fibre (e.g. PET or polyamide), it is found that, for dark shades, an increased let-down-ratio (LDR) of the colourant generally produces a drop in melt pressure at the spinneret. Such a pressure drop can lead to instability in fibre spinning which manifests itself as an increase in the rate of filament breakages compared to polymeric material which is not treated with the liquid formulation. This problem becomes particularly apparent when the LDR is greater than 1%, especially with fine denier fibre (e.g. of lower than 5 denier per filament) and/or when the colourant is dye-based It is an object of preferred embodiments of the invention to address the above described problems.

It is an object of preferred embodiments to provide a liquid formulation which may advantageously be used for introducing additives into polymeric materials.

According to a first aspect of the invention, there is provided a liquid formulation for addition to a polymeric material, said liquid formulation comprising a vehicle, an additive (e.g. a colourant) and carbonyl bis (1-caprolactan)) (herein referred to as CBC).

Unless otherwise stated, optional substituents described herein include halogen atoms and alkyl, acyl, nitro, cyano, alkoxy, hydroxy, amino, alkylamino, sulphinyl, alkylsulphinyl, sulphonyl, alkylsulphonyl, sulphonate, amido, alkylamido, alkoxycarbonyl, halocarbonyl and haloalkyl groups.

Unless otherwise stated, alkyl, alkenyl or alkynyl groups may have up to twenty carbon atoms, preferably up to fifteen carbon atoms, more preferably up to eleven carbon atoms.

Said vehicle suitably has one or more of the following properties:

Property No. 1—a flash point, suitably measured in accordance with ASTM D92 Cleveland Open Cup (COC) method of greater than 272° C., preferably greater than 280° C., more preferably greater than 285° C., especially greater than 290° C. The flash point may be less than 350° C., 340° C. or 330° C.

Property No. 2—a % weight retention determined by Thermogravimetric Analysis (TGA) of greater than 80 wt %, preferably greater than 85 wt %, more preferably greater than 90 wt %. The procedure may involve: using a TA Instruments TGA Q500 the TGA weight retention of the example liquid carriers is determined by placing 10 mg of a selected carrier in a TGA sample pan and recording the weight loss on heating from 40° C. to 295° C. at 20° C./min and then holding the sample at 295° C. for 30 minutes. After this heating cycle, the % weight retention is recorded.

Property No. 3—a boiling point at 760 mmHg in accordance with ASTM D1078 in the range 650 to 1150° C., preferably in the range 700° C. to 1000° C.

Property No. 4—a pour point measured in accordance with ASTM D97 in the range −55° C. to 0° C.

Property No. 5—a viscosity measured using a Brookfield viscometer, spindle 2, 20 rpm at 20° C. in the range 50-3500 cP, more preferably in the range 200-1800 cP.

Property No. 6—a number average molecular weight as measured by gel permeation chromatography (GPC) calibrated to a polystyrene standard in the range 600-1800 g/mol, preferably in the range 600-1600 g/mol, more preferably in the range 750-1250 g/mol.

Property No. 7—a molecular mass as calculated from its idealised molecular structure in the range 600-1800 g/mol, preferably in the range 600-1600 g/mol, more preferably in the range 750-1250 g/mol.

Said vehicle may include at least four of said properties, preferably at least five, more preferably at least six, especially all of said properties.

In a preferred embodiment, said vehicle has a flash point of at least 285° C., a % weight retention of greater than 85 wt %, and a number average molecular weight (Property No. 6) in the range 750-1250 g/mol.

When said liquid formulation includes more than one vehicle, said Properties 1 to 6 suitably refer to the predominant vehicle, but preferably apply to each vehicle included in the formulation.

Said formulation is suitably pumpable and stable to sedimentation of any solid particulates that may be present.

Said vehicle is suitably a liquid at STP. Said liquid formulation is preferably a liquid at STP. Said vehicle preferably has a boiling point (at atmospheric pressure of 760 mmHg) of greater than 300° C., preferably greater than 350° C., more preferably greater than 500° C. The boiling point may be less than 1150° C. or less than 1000° C. The melting point of the vehicle may be less than 0° C. or less than −10° C.

Preferably, the vehicle has good compatibility with said polymeric material such that when the polymer containing 1 wt % vehicle is cooled to room temperature excessive migration of the vehicle to the surface of the polymer is not observed.

Said vehicle preferably gives none or minimum fuming at a die plate when spun into fibre at an addition level of 1 wt %, preferably at 1.5 wt %.

BRIEF DESCRIPTION OF THE DRAWINGS

FIG. 1 is a schematic representation of a pilot fibre line.

In an embodiment (I), said vehicle may comprise an aliphatic or aromatic di- or tri-carboxylic acid covalently linked by ester bonds to two or more chains.

In an embodiment (II), said vehicle may include a moiety —OCOR$^{50}$ wherein R$^{50}$ includes a carbon atom chain having at least 5, preferably at least 8 carbon atoms. Said carbon atom chain may include fewer than 24 carbon atoms or fewer than 20 carbon atoms. R$^{50}$ suitably includes at least 5, preferably at least 8 —CH$_2$— moieties; it may include less than 24 —CH$_2$-moieties. R$^{50}$ may include zero or one carbon-carbon double bonds; it preferably includes no carbon-carbon double bonds. R$^{50}$ preferably includes an unsubstituted C$_5$-C$_{24}$, more preferably C$_8$-C$_{24}$ alkyl group, especially a C$_{17}$-C$_{20}$ group.

R$^{50}$ may consist of said carbon atom chain as described or may include another moiety in addition to said carbon atom chain. For example R$^{50}$ may be of formula —R$^{51}$ $R^{52}$ wherein $R^{52}$ represents said carbon atom chain described and $R^{51}$ represents a linking moiety which links the carbon atom of the carbonyl moiety of —OCOR$^{50}$ to moiety $R^{52}$. $R^{51}$ may represent an alkyleneoxy moiety for example of formula A referred to below.

The total number of carbon atoms in $R^{50}$ may be at least 5, preferably at least 8, more preferably at least 10, especially at least 17. The total number may be less than 30, for example less than 25.

The total number of hydrogen atoms in $R^{50}$ may be at least 11, preferably at least 17, more preferably at least 21, especially at least 34. The total number may be less than 62 or less than 52.

The number of oxygen atoms in $R^{50}$ may be in the range 0 to 10. It is preferably 0.

$R^{50}$ preferably includes no atoms other than carbon, hydrogen and oxygen atoms. In some embodiments, $R^{50}$ only includes carbon and hydrogen atoms.

Said vehicle may include at least 3 ester moieties (i.e. —OCO— moieties). It may include 3 to 6 ester moieties. It preferably includes 4 ester moieties. Each of said ester moieties may include a moiety —OCOR$^{50}$ as described.

The sum of the number of carbon atoms in all $R^{50}$ groups of moieties —OCOR$^{50}$ in said vehicle may be at least 15, preferably at least 24, more preferably at least 30, especially at least 70. The sum of the number of —CH$_2$— moieties in all $R^{50}$ groups of moieties —OCOR$^{50}$ may be at least 15, preferably at least 24, more preferably at least 30, especially at least 64.

Ester moieties of formula —OCOR$^{50}$ may be spaced apart by a chain comprising at least 3 carbon atoms. Said chain may be saturated and/or aliphatic; or part of an aromatic, for example phenyl moiety.

Said vehicle preferably includes no atoms other than carbon, hydrogen and oxygen atoms. It preferably includes carboxy (—COO—) oxygen atoms; and it may include ether (—O—) oxygen atoms. It preferably includes no other types of oxygen atoms (e.g. no —OH moieties).

Said vehicle may be selected from groups (A) to (I) as follows:

Group A

Pentaerythritol tri or tetra esters where the ester is derived or derivable from reaction of pentaerythritol with a carboxylic acid with a carbon chain length of $C_{12}$ to $C_{22}$, preferably $C_{14}$ to $C_{20}$, especially $C_{17}$ to $C_{19}$. A preferred carboxylic acid is a $C_{18}$ oleic acid with $C_{18}$ isostearic acid being especially preferred.

Said vehicle may be of general formula

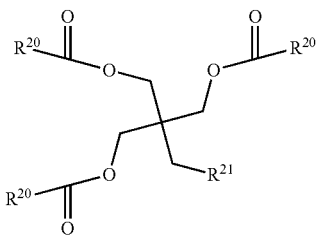

wherein each $R^{20}$ independently represents a $C_{11}$ to $C_{21}$ optionally-substituted, preferably unsubstituted, linear or branched, saturated or unsaturated alkyl group; and $R^{21}$ comprises a moiety $R^{20}$COO— or an hydroxy group. Preferably, $R^{21}$ comprises a moiety $R^{20}$CO—. Preferably, each $R^{20}$ represents the same group. $R^{20}$ may comprise carbon and hydrogen atoms only. It may include a —CH=CH— moiety, for example no more than one such moiety. $R^{20}$ suitably has a carbon chain length of $C_{13}$ to $C_{19}$, preferably a $C_{17}$ carbon chain length. $R^{20}$ preferably consists of an aliphatic, unsubstituted hydrocarbon moiety which optionally includes a —CH=CH— moiety. $R^{20}$COO— may comprise an oleic acid residue or preferably an isostearic acid residue.

In a preferred embodiment, said vehicle is a pentaerythritol tetra ester, suitably of said formula, wherein $R^{21}$ comprises a moiety $R^{20}$C— and preferably each $R^{20}$ represents a $C_{11}$ to $C_{21}$ (especially a $C_{13}$ to $C_{19}$) aliphatic, unsubstituted, saturated alkyl moiety. Said vehicle is preferably pentaerythritol tetraisostearate.

Group B

Alkoxylated pentaerythritol tri or tetra esters where the ester is derived or derivable from the reaction of an alkoxylated pentaerythritol with a carboxylic acid with a carbon chain length of $C_{12}$ to $C_{22}$, preferably $C_{14}$ to $C_{20}$. The alkoxylated pentaerythritol may have the following structure:

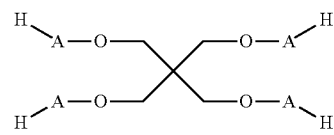

where A is —[—O—CH$_2$—CH$_2$— ]$_x$—[—O—CH$_2$—CH(CH$_3$)]$_y$—[O—CH$_2$—CH$_2$—CH$_2$—CH$_2$—]$_z$— where x, y and z can independently be between 0 and 10 such that x+y+z is >0 and is less than or equal to 10 and where the sum of all the alkoxylate units in the structure is between 4 and 40. It will be appreciated that moiety A bonds to the —O— atom via a —CH$_2$— moiety.

Said vehicle may be of general formula

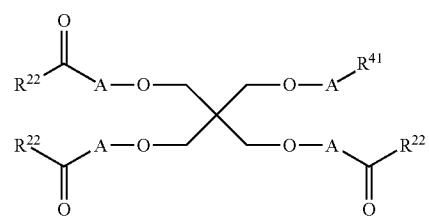

wherein A is as described above and each $R^{22}$ represents a $C_{11}$ to $C_{21}$ optionally-substituted, preferably unsubstituted, linear or branched saturated or unsaturated alkyl group; and $R^{41}$ comprises a moiety $R^{22}$CO— or a hydrogen atom. Preferably, each $R^{22}$ represents the same group. $R^{22}$ may comprise carbon and hydrogen atoms only. It may include a —CH=CH— moiety, for example no more than one such moiety. $R^{22}$ suitably has a carbon chain length of $C_{13}$ to $C_{19}$ carbon atoms. $R^{22}$ preferably consists of an aliphatic, unsubstituted hydrocarbon moiety which optionally includes a —CH=CH— moiety.

Group C

Dipentaerythritol penta or hexa esters where the ester is derived from the reaction of dipentaerythritol with a carboxylic acid with a carbon chain length of $C_5$ to $C_{18}$, preferably $C_5$ to $C_{18}$, more preferably $C_8$ to $C_{10}$.

Said vehicle may be of general formula

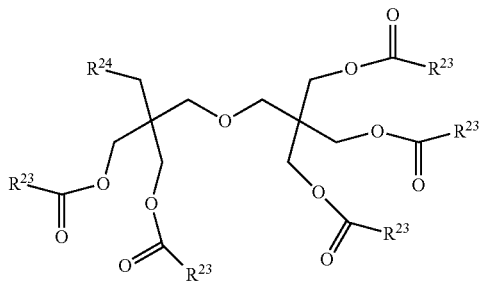

wherein each $R^{23}$ independently represents a $C_4$ to $C_{17}$ optionally-substituted, preferably unsubstituted, linear or branched, saturated or unsaturated alkyl group; and $R^{24}$ comprises a moiety $R^{23}COO-$ or an hydroxy group. Preferably, each $R^{23}$ represents the same group. $R^{23}$ may comprise carbon and hydrogen atoms only. It may include a $-CH=CH-$ moiety, for example no more than one such moiety. $R^{23}$ suitably has a carbon chain length of $C_7$ to $C_{17}$, preferably a $C_7$ to $C_9$ carbon chain length. $R^{23}$ preferably consists of an aliphatic, unsubstituted hydrocarbon moiety which optionally includes a $-CH=CH-$ moiety.

Group D

Alkoxylated dipentaerythritol penta or hexa esters where the ester is derived or derivable from the reaction of an alkoxylated dipentaerythritol with a carboxylic acid with a carbon chain length of $C_5$ to $C_{16}$, preferably $C_8$ to $C_{14}$. The alkoxylated pentaerythritol may have the following structure:

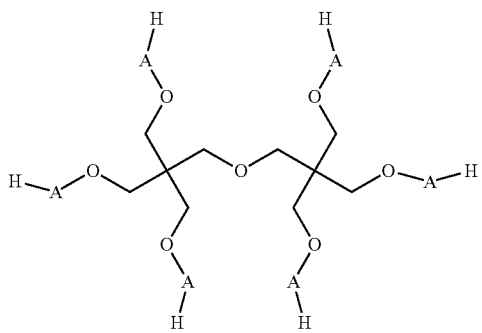

where A is $-[-O-CH_2-CH_2-]_x-[-O-CH_2-CH(CH_3)]_y-[O-CH_2-CH_2-CH_2-CH_2-]_z-$ where x, y and z can independently be between 0 and 6 such that x+y+z is >0 and is less than or equal to 6 and where the sum of all the alkoxylate units in the structure is between 6 and 36. It will be appreciated that moiety A bonds to the $-O-$ atom via a $-CH_2-$ moiety.

Said vehicle may be of general formula

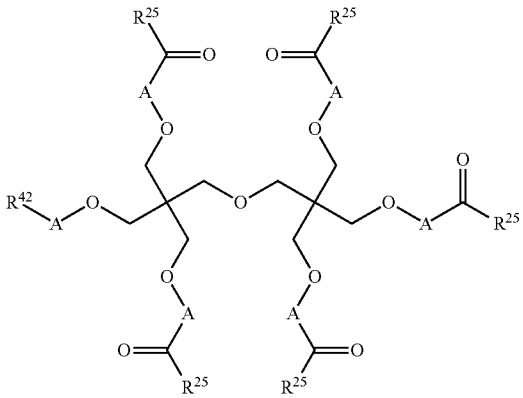

wherein A is as described above and each $R^{25}$ represents a $C_{14}$ to $C_{15}$ optionally-substituted, preferably unsubstituted, linear or branched saturated or unsaturated alkyl group; and $R^{42}$ comprises a moiety $R^{25}CO-$ or a hydrogen atom. Preferably, each $R^{25}$ represents the same group. $R^{25}$ may comprise carbon and hydrogen atoms only. It may include a $-CH=CH-$ moiety, for example no more than one such moiety. $R^{25}$ suitably has a carbon chain length of $C_7$ to $C_{13}$ carbon atoms.

Group E

Trimethylolpropane triesters where the ester is derived or derivable from the reaction of trimethylolpropane with a carboxylic acid with a carbon chain length of $C_8$ to $C_{22}$, preferably $C_{10}$ to $C_{20}$, more preferably $C_{12}$ to $C_{18}$.

Said vehicle may be of general formula

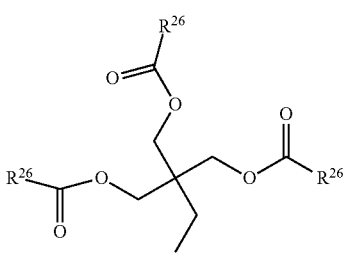

Preferably, each $R^{26}$ represents the same group. $R^{26}$ may comprise carbon and hydrogen atoms only. It may include a $-CH=CH-$ moiety, for example no more than one such moiety. $R^{26}$ suitably has a carbon chain length of $C_7$ to $C_{21}$, preferably a carbon chain length of $C_9$ to $C_{19}$ and more preferably, a carbon chain length of $C_{11}$ to $C_{17}$.

Group F

Alkoxylated trimethylolpropane triesters where the ester is derived or derivable from the reaction of an alkoxylated trimethylolpropane with a carboxylic acid with a carbon chain length of $C_8$ to $C_{22}$, preferably $C_{10}$ to $C_{20}$, more preferably $C_{12}$ to $C_{18}$. The alkoxylated trimethylolpropane may have the following structure:

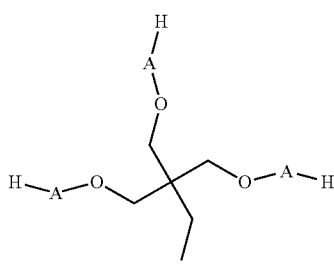

where A is —[—O—CH$_2$—CH$_2$—]$_x$—[—O—CH$_2$—CH(CH$_3$)]$_y$—[O—CH$_2$—CH$_2$—CH$_2$—CH$_2$—]$_z$— where x, y and z can independently be between 0 and 15 such that x+y+z is >0 and is less than or equal to 15 and where the sum of all the alkoxylate units in the structure is between 3 and 45. It will be appreciated that moiety A bonds to the —O— atom via a —CH$_2$— moiety.

Said vehicle may be of general formula

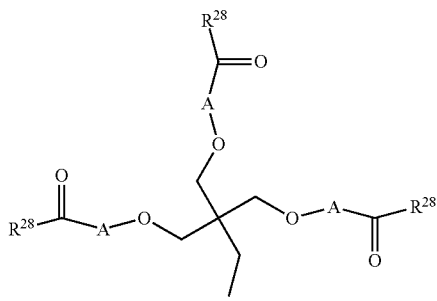

wherein A is as described above and each R$^{28}$ represents a C$_7$ to C$_{21}$ optionally-substituted, preferably unsubstituted, linear or branched saturated or unsaturated alkyl group. Preferably, each R$^{28}$ represents the same group. R$^{28}$ may comprise carbon and hydrogen atoms only. It may include a —CH═CH— moiety, for example no more than one such moiety. R$^{28}$ suitably has a carbon chain length of C$_9$ to C$_{19}$ carbon atoms, more preferably C$_{11}$ to C$_{17}$.

Group G

Esters of the tri-carboxylic acid of general formula:

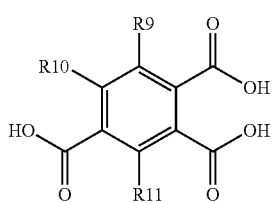

(V)

where R$^9$, R$^{10}$ and R$^{11}$ independently represent a hydrogen atom, an ester group or an optionally-substituted, preferably unsubstituted, alkyl group. At least one, preferably each of R$^9$, R$^{10}$ and R$^{11}$ represent hydrogen atoms.

The preferred ester-containing vehicles are derived or derivable by reacting the described tri-carboxylic acids with C$_8$ to C$_{24}$ aliphatic alcohols, preferably C$_{10}$ to C$_{18}$, most preferably C$_{13}$.

The tri-carboxylic acids may be reacted with polyalkoxylated fatty alcohols. The alkoxylating moieties are preferably present at between 1 and 80 moles per each fatty alcohol, more preferably between 1 and 70 and most preferably between 1 and 60 moles per fatty alcohol.

Preferred fatty alkoxylated esters derived or derivable from said tri-carboxylic acid groups include polyalkoxylated fatty alcohol chains:

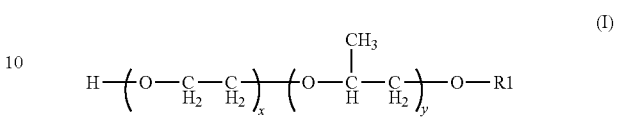

(I)

The chains suitably form ester bonds with carboxylic acid groups via the —O— moiety at the left hand side of structure I.

R$^1$ may be unsaturated or saturated, unsubstituted or substituted, aromatic or aliphatic fatty moiety with between 1 and 20 (for example between 1 and 10) carbon atoms. x and y may independently be between 0 and 10. The sum of all x and y must be greater than 0. The sum of all x and y preferably does not exceed 70.

The fatty alcohols such as species (I) may be prepared by the polyalkoxylation of saturated or unsaturated, substituted or unsubstituted aliphatic or aromatic fatty alcohols. As is well known to those skilled in the art, the fatty moieties are often present as a mixture and so the vehicle may comprise a mixture of compounds.

The tricarboxylic acid derived compounds are suitably esterified on two or three of the carboxylic acid groups (of the acid of formula V) with the above described aliphatic or polyalkoxylated fatty alcohol.

The fatty alkoxylate esters may be prepared by reaction of the starting alcohol with either ethylene or propylene oxide in the presence of an acidic or basic catalyst.

Preferred esters of said tri-carboxylic acids may be of formula

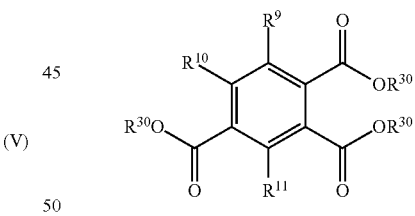

wherein R$_9$, R$_{10}$ and R$_{11}$ are as described above and R$^{30}$ represents a C$_8$ to C$_{24}$ optionally-substituted, preferably unsubstituted, linear or branched, saturated or unsaturated alkyl group; or represents a moiety of formula I which excludes the hydrogen atom of the terminal —OH group.

Preferably, each R$^{30}$ represents the same group. R$^{30}$ may comprise carbon and hydrogen atoms only. It may include a —CH═CH— moiety, for example no more than one such moiety. R$^{30}$ suitably has a carbon chain length of C$_{10}$ to C$_{18}$, preferably C$_{13}$ carbon atoms.

Group (H)

Aliphatic dicarboxylic acid species containing between 2 and 22 carbon atoms in the main structural backbone, more preferably between 2 and 10, with a typical structure being outlined below:

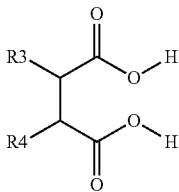

(III)

where $R^3$ and $R^4$ independently represent optionally-substituted alkyl, alkenyl or alkynyl groups or $R^3$ and $R^4$ together with the atoms to which they are bonded define an optionally-substituted cyclic moiety. $R^3$ and $R^4$ suitable independently include 0-20, preferably 2-10, more preferably 2-4 carbon atoms. Examples of dicarboxylic acids include succinic acid, malonic acid and maleic acid.

Preferably, $R^3$ and $R^4$ together with the atoms to which they are bonded define an optionally-substituted cyclic, preferably aromatic moiety. Preferably, said aromatic moiety has six ring atoms, preferably six ring carbons atoms. Optional substituents of the cyclic, for example aromatic, moiety, may be independently selected from ester and optionally-substituted, preferably unsubstituted, alkyl groups. When said cyclic moiety is substituted, it is preferably substituted at two or fewer or one or fewer positions. Thus, preferably, at least two substituents on the cyclic structure represent hydrogen atoms and preferably three or all four of the substituents on the cyclic structure represent hydrogen atoms.

Preferred aromatic carboxylic acids may contain between 6 and 20, more preferably 8 and 12 carbon atoms. Preferably, said carboxylic acid is of general formula:

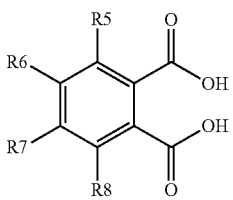

(IV)

wherein $R^5$, $R^6$, $R^7$ and $R^8$ independently represent a hydrogen atom, an ester group or an optionally-substituted, preferably unsubstituted, alkyl group. An example of a suitable aromatic dicarboxylic acid is phthalic acid. 1,2 phthalic acid is preferred to give appropriate ortho functionality.

Group I

Fatty acid diesters of hydroxyl terminated polyester plasticisers derived from adipic acid and an alky diol; acetylated monoglycerides from hydrogenated castor oil; and ethoxylated fatty acid diesters, for example of formula

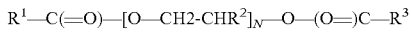

where $R^1$ and $R^3$ are $C^8$ to $C^{22}$ linear or branched hydrocarbon chains;

$R^2$ is H or $CH_3$; and

N=3 to 20

Said vehicle is preferably selected from groups A, C, E, F, G and H. Said vehicle is, more preferably, selected from Group A.

Said additive may be selected from colourants, stabilizers, delusterants, anti-static agents, optical brighteners, processing aids, light reflective additives, anti-soil additives, friction modifiers, anti-oxidants and anti-flammability additives. Said additive preferably comprises a colourant. A said colourant may be a dye or pigment. A dye may be especially preferred.

Said liquid formulation may include less than 80 wt %, suitably less than 70 wt %, preferably less than 65 wt %, more preferably less than 60 wt % of a said additive (e.g. a colourant). Typically, said formulation includes 5-80 wt % of a said additive (e.g. a colourant). The total amount of additives (selected from colourants, stabilizers, delusterants, anti-static agents, optical brighteners, processing acids, light reflective additives, anti-soil additives, friction modifiers, anti-oxidants, insecticides and anti-flammability additives) in said formulation may be more than 1 wt %, suitably more than 2 wt %, preferably more than 5 wt %; typically the total amount of additives is in the range 5-80 wt %. In one embodiment, the total amount of additives may be in the range 20-60 wt %. For the avoidance of doubt, the wt % refers to the wt % of additive excluding any vehicle (or the like) with which the additive may be formulated prior to being incorporated into the liquid formulation.

More than one additive may be required (and included in said formulation). For example, a mixture of dyes and/or pigments may be required in order to provide a colormatch to a customer requirement. Other additives which are commonly added to fibre may include light reflectance additives, anti-static or anti-soil species, friction modifiers, anti-oxidants, anti-flammability additives etc. These may be added alone or in a package together with a colored species.

In a preferred embodiment, said formulation includes at least 10 wt %, preferably at least 20 wt %, more preferably at least 30 wt % of a specific colourant (A). It may include less than 60 wt % or less than 45 wt % of said colourant (A). The colourant (A) may be a pigment or dye.

The sum of the wt % of all colourants in said formulation may be at least 20 wt %, preferably a least 25 wt %, more preferably at least 30 wt %. Said sum may be less than 80 wt % or less than 65 wt %.

Said liquid formulation may include at least 2 wt %, preferably at least 4 wt %, more preferably at least 6 wt % of CBC. In some embodiments, the formulation may include at least 8 wt % of CBC. The formulation may include less than 25 wt % CBC.

Said liquid formulation may include at least 30 wt %, preferably at least 40 wt % of vehicle. It may include at least 30 wt %, preferably at least 40 wt % of a specific vehicle (A), for example of a type described herein. The formulation may include less than 80 wt % vehicle, in total and, preferably, less than 80 wt % of said vehicle (A).

Said liquid formulation may include:
30-80 wt % of one or more vehicles;
5-60 wt % of one or more colourants;
3-25 wt % of CBC.
Preferably, said liquid formulation includes:
40-70 wt % of one or more vehicles;
20-50 wt % of one or more colourants;
3-20 wt % of CBC.
Preferably said liquid formulation includes:
30-80 wt % (preferably 40-70 wt %) of a pentaerythritol tetra ester as described in Group A above; and especially pentaerythritol tetraisostearate;
5-60 wt % (preferably 20-50 wt %) of one or more colourants;
2-25 wt % (preferably 3-20 wt %) of CBC.

In said liquid formulation, the ratio of the total weight of colourants divided by the weight of CBC may be at least 2, and, it may be less than 10. The ratio of the total weight of one or more vehicles divided by the weight of CBC may be at least 2; and it may be less than 10.

The formulation may optionally include a dispersant which is used to improve the shelf-life and prevent sedimentation of any solid particulates. Said dispersant may comprise a backbone, the function of which is to provide compatibility with the carrier phase and a headgroup which anchors the dispersant onto the surface of the additive. The dispersant may also be arranged to disperse the CBC. Said dispersant may be selected from single molecule or polymeric species with a range of functionalities within the molecular backbone and anchor groups.

Said liquid formulation may include less than 30 wt %, preferably less than 20 wt %, more preferably less than 12 wt % of dispersant.

In said liquid formulation, said CBC may include particles having a 1 µm or greater median particle diameter. The median particle diameter may be 200 µm or less, preferably 100 µm or less, more preferably 50 µm or less. As used herein, a d50 particle size is the median diameter, where 50% of the volume is composed of particles larger than the stated d50, and 50% of the volume is composed of particles smaller than the stated d50 value. As used herein, the median particle size is the same as the d50 particle size. In the aforementioned the particle sizes and/or median diameter may be assessed by laser diffraction, for example using a Horiba LA950 Laser Particle Size Analyzer. Preferably, said liquid formulation includes less than 1 wt % of particles having a diameter greater than 200 µm, for example greater than 100 µm.

According to a second aspect of the invention, there is provided a method of preparation of a liquid formulation, preferably as described in the first aspect, the method comprising:
  (a) selecting a vehicle;
  (b) selecting an additive (e.g. a colourant);
  (c) selecting carbonyl bis (1-caprolactam) (CBC); and
  (d) contacting the vehicle, additive and CBC.

The method preferably comprises dispersing the CBC in the vehicle. The method preferably comprises dispersing one or more other additives in the vehicle. The method may comprise use of a surface active agent to facilitate dispersion of insoluble components in the vehicle.

The liquid formulation may have any feature of the liquid formulation of the first aspect.

According to a third aspect of the invention, there is provided a method of introducing an additive (e.g. a colourant) into a polymeric material, the method comprising:
  (i) selecting a polymeric material;
  (ii) contacting the polymeric material with said additive, carbonyl bis (1-caprolactam) (CBC) and vehicle; and
  (iii) melt-processing said polymeric material.

The method preferably comprising selection of a liquid formulation comprising said vehicle, said additive and CBC and contacting the polymeric material with said liquid formulation. Said liquid formulation may have any feature of the liquid formulation of the first aspect and/or may be made as described in accordance with the second aspect.

Preferably, said polymeric material comprises a synthetic thermoplastic polymer. Said polymeric material is preferably able to be formed into fibres. Said polymeric material may be a condensation polymer, for example a condensation polymer which may depolymerise in the presence of water and/or a carrier with appropriate functional groups (which could include but is not limited to hydroxyl and carboxylic acid species). Said polymeric material may be selected from polyesters, polyamides, polypropylene, polycaprolactone, polycarbonates, acrylics and aramids.

Examples of polyamides include aliphatic PA6 and PA6,6, semi-aromatic polyphthalamides (e.g. PA 6T) and aromatic polyamides in which at least 85% of the amide linkages, (—CO—NH—) are attached directly to two aromatic rings—for example the para-aramids.

Said polymeric material preferably comprises a polyester which may be selected from poly(ethylene terephthalate) (PET), poly(butylene terephthalate) (PBT), poly(trimethylene terephthalate) (PTT), poly(ethylene naphthalate) (PEN), poly(1,4-cyclo-hexylenedimenthylene) terephthalate (PCT), poly(ethylene-co-1,4-cyclohexylenedimethylene terephthalate) (PETG), copoly(1,4-cyclohexylene dimethylene/ethylene terephthalate) (PCTG), poly(1,4-cyclohexylene dimethylene terephthalate-co-isophthalate) (PCTA), poly(ethylene terephthalate-co-isophthalate) (PETA), poly(lactic acid (PLA), poly(glycolic acid) (PGA) and their blends of copolymers. Said polymeric material preferably comprises, more preferably consists essentially of PET.

A typical spinnable condensation polymer such as polyester, for example PET, may have up to 250 or up to 200 repeat units (e.g. molecular weight of up to 25,000 or up to 20,000). The number of repeat units may be in the range 50-200, suitably 75-200, preferably 75-125 repeat units. A typical spinnable polymer may have about 100 repeat units. The condensation polymer may be linear and be able to reach the high levels of orientation and crystallinity which are induced during spinning and drawing processes.

Typical spinnable polyesters have an IV in the range 0.62 to 1 dl/g. Preferred polyesters have an IV within the range of 0.5 to 1.2 dl/g when measured using standard techniques (for example ASTM D4603-03).

The method may include introducing less than 10 wt %, more suitably less than 5 wt %, preferably less than 4 wt % of a said additive, selected from those described above (preferably a colourant), into said polymeric material via said liquid formulation. At least 1 wt % of a said additive (preferably a colourant) may be introduced via said liquid formulation. The total amount of additives, selected from those described above, introduced into said polymeric material via said liquid formulation may be less than 10 wt %, more preferably less than 5 wt %. Typical amounts of additives introduced using the method described are typically in the range of 0.05-3 wt %.

The method may comprise introducing less than 10 wt %, preferably less than 6 wt % and more preferably less than 4 wt % of vehicle into the polymeric material, via said formulation. The amount introduced may be less than 3 wt %.

When the method uses a liquid formulation as described, the method preferably comprises contacting said polymeric material with said liquid formulation at a let-down-ratio (LDR) of at least 0.5%, preferably at least 1% more, preferably at least 2%, especially at least 4%. That is, the ratio of the weight of polymeric material divided by the weight of liquid formulation may be 100:0.5, 100:1, 100:2 or 100:4 respectively. Use of the liquid formulation may be particularly advantageous at higher LDRs. The LDR may be at least 1.1%, 1.3% or 1.5%.

The higher the LDR, the more CBC it may be desirable to introduce in the method and/or the greater wt % of CBC which may be introduced. The method may comprise introducing at least 0.05 parts of CBC per 100 parts of polymeric material. It may comprise introducing less than 0.6 parts of CBC per 100 parts of polymeric material. The method may comprise using an LDR of greater than 2%, preferably greater than 4% and introducing at least 0.08 parts, preferably at least 0.2 parts of CBC per 100 parts of polymeric material.

In the method, the liquid formulation is preferably dosed into said polymeric material when said polymeric material is in a molten state. Said polymeric material may be melted in an extruder and said liquid formulation may be contacted with the polymeric material in said extruder or downstream thereof. Said liquid formulation is preferably injected at relatively high pressure (5-220 bar, for example 100 to 220 bar) into the polymeric material. A mixing means is suitably provided for facilitating mixing of the liquid formulation and polymeric material. The mixing means may be provided by using either static or dynamic mixers. Dynamic mixers are preferred in applications where liquid formulations are added to the melt phase of the polymer i.e. where small amounts of low viscosity fluid require mixing with large volumes of high viscosity fluid. Cavity transfer mixers are especially preferred due to the high distributive mixing forces that are applied down the length of the mixer enabling the required high shear process to be applied in a controllable manner. Downstream of the point of contact of liquid formulation and polymeric material, there may be a spinning means for spinning the polymeric material to define fibres. The same general set up could be used to make other articles from thermoplastic polymers; for example sheet or film—the means of exit would be through the relevant die heads.

Said polymeric material which is contacted in the method may be supplied directly from a reactor in which the polymeric material is made in a polymerisation reaction. Thus, said polymeric material used suitably does not comprise pellets or granules or other isolated polymeric material but suitably comprises molten polymeric material from a polymerisation reactor which is coupled to apparatus for contacting said polymeric material with liquid formulation as described.

Advantageously, the method may be used to introduce additives into polymeric materials, especially polyesters, for example PET, without significantly affecting the Intrinsic Viscosity (IV) of the polymeric material (which may suitably be assessed as described in Test 1 hereinafter). The ratio of the IV selected in step (i) of the method divided by the IV of the polymeric material after melt-processing in step (iii) of the method may be at least 0.80 dL/g, preferably at least 0.90 dL/g, and may be less than 1.20 dL/g.

According to a fourth aspect of the invention, there is provided a product comprising a polymeric material incorporating an additive (for example a colourant), wherein said product includes carbonyl bis (1-caprolactam) (CBC).

The product may also include vehicle of a type described herein.

Said product of the fourth aspect is preferably a fibre, especially a polyester fibre.

According to a fifth aspect, there is provided a method of producing a fibre, the method comprising introducing an additive and carbonyl bis (1-caprolactam) (CBC) into a polymeric material as described according to the first aspect and spinning the polymeric material which includes the additive and CBC to produce a fibre, suitably a substantially continuous length of fibre, for example of greater than 5 m or 10 m.

The method may include delivery of said polymeric material into an extruder directly from a reactor in which the polymeric material is produced.

Preferably, said polymeric material is a polyester, for example polyethylene terephthalate.

According to a sixth aspect, there is provided an assembly comprising:
(a) an extruder for extruding polymeric material;
(b) a receptacle containing a liquid formulation as described according to the first aspect;
(c) injection means operatively connected to the receptacle for injecting liquid formulation extracted from the receptacle into the polymeric material, for example in or downstream of the extruder;
(d) mixing means for mixing liquid formulation and polymeric material.

The assembly may further include a polymerisation reactor for producing said polymeric material in a polymerisation reaction, suitably from monomers, said reactor being operatively connected to the extruder for delivering polymeric material from reactor to extruder.

The assembly may further comprise spinning means downstream of the extruder and injection means for receiving polymeric material which has been contacted with said liquid formulation and spinning the polymeric material to produce fibre.

Any invention described herein may be combined with any feature of any other invention or embodiment described herein mutatis mutandis.

Specific embodiments of the invention will now be described, by way of example, with reference to FIG. 1 which is a schematic representation of a pilot fibre line.

In the following, firstly, tests used in assessing features associated with the process and products produced by the process are initially described. Then, Example 1 describes preparation of a carbon black dispersion which is used with varying amounts of carbonyl bis (1-caprolactam) (CBC) formulations in Examples 2 to 5 and with pyromellitic anhydride in comparative Example 6. The preparation and testing of fibre samples using different formulations, including those of Examples 2 to 5, are described in Examples 7 to 12. The preparation and testing of further formulations is described in Examples 13 to 16.

The following tests are referred to hereinafter:
Test 1—Determination of Intrinsic Viscosity (IV)
The intrinsic viscosity of PET fibre samples was determined using ASTM D4603 at 30° C. (concentration of 0.5 wt/v; solvent 60/40 phenol/tetrachloroethane).
Test 2—Determination of Fibre Tenacity
Using an Instron 3365 the tenacity of the fibre sample was determined at 20° C. and an extension rate of 250 mm/min (ASTM D885).
Test 3—Determination of Die Head Pressure
A probe was inserted into the polymer melt after the melt pump and upstream of the spinneret to obtain die head pressure values.
Test 4—Determination of Elongation
This was determined as described for Test 2

Example 1—Carbon Black Liquid Dispersion 400 g of carbon black (Monarch 430) was mixed under high shear with 503 g of pentaerythritol tetraisostearate sold as CRODAMOL PTIS, 95 g of Solplus K240 (hyperdispersant), 1 g Irganox 1010 (anti-oxidant) and 1 g of Doverphos (anti-oxidant) before being milled using 70% loaded 0.8 beads until the required particle size was achieved. A particle size of less than 5 μm was required for the formulations to achieve good dispersion in the fibre, to increase shelf-life of the formulation and prevent sedimentation.

Examples 2 to 5—Preparation of Formulations Containing Carbonyl Bis (1-Caprolactam) (CBC)

CBC in powder form (particle size less than 50 μm) was blended into the carbon black formulation of Example 1 by high shear mixing at ambient temperature (21° C.). Varying amounts of CBC were incorporated as detailed in Table 1.

TABLE 1

| Example No. | Weight (g) of Example 1 formulation | Weight (g) of CBC |
| --- | --- | --- |
| 2 | 100 | 10.00 |
| 3 | 100 | 13.33 |
| 4 | 100 | 16.67 |
| 5 | 100 | 20.00 |

Example 6 (Comparative)

Pyromellitic anhydride (PMDA), an additive previously used by Applicant, was blended with the black formulation of Example 1, instead of the CBC. The composition comprised 100 g of the formulation of Example 1 and 5 g of PMDA.

Examples 7 to 12—Preparation of Fibre Samples

Apparatus for the preparation of the fibre samples, shown in FIG. 1, comprises a hopper 1 for feeding PET resin into an extruder. Liquid additive formulation is injected into molten PET at position 2 using injection apparatus 3. Die head pressure may be assessed at position 3. The mixture is spun into fibre via spinning head 4.

Partially orientated (POY) polyethylene terephthalate (PET), 165 dtex/48f, fibre was produced by melt extruding a sample of PET (Equipolymers C93), that had been dried for 4 hours at 170° C. through a 30 mm extruder (L/D ratio of 24/1) fitted with a cavity transfer mixer (CTM speed=90 rpm) and a 48 hole (hole diameter 0.4 mm) spin pack at 285° C. and 2.72 kg/hours. The extruded fibre was drawn from the spinneret using a Barmag ASW602 winder (winder speed 2,800 m/min). Table 2 records details of the fibres produced, die head pressures and tensile properties of the fibre measured in accordance with Tests 1 to 4.

Liquid formulations of Examples 1 to 6 were added to the melt stream at position 2 using a Flex-IM Colour Cart calibrated with a CM6000 controller unit. The formulations were dosed through high pressure braided cable into the injector system and then mixed into the melt stream using a cavity transfer mixer (speed 90 rpm).

Results are provided in Table 2. "phr" refers to parts by weight of the formulation used per hundred parts of resin.

TABLE 2

| Example No. | Dose rate of and identity of formulation used | Die Head Pressure (bar) | Tenacity (cN/Dtex) | Elongation (%) | IV dL/g | Could fibre be spun? | CBC content in the final fibre |
| --- | --- | --- | --- | --- | --- | --- | --- |
| Example 7 (comparative) | 0 | 52 | 2.11 | 110 | 0.659 | Yes | 0 |
| Example 8 (comparative) | 3.0 phr Example 1 formulation | 29 | 1.91 | 123 | 0.591 | Yes | 0 |
| Example 9 | 3.3 phr Example 2 formulation | 43 | 1.90 | 109 | 0.642 | Yes | 0.3 phr |
| Example 10 | 3.4 phr Example 3 formulation | 47 | 1.95 | 105 | 0.673 | Yes | 0.4 phr |
| Example 11 | 3.5 phr Example 4 formulation | 54 | 1.99 | 101 | 0.700 | Yes | 0.5 phr |
| Example 12 Comparative | 3.15 phr Example 6 formulation | 47 | — | — | — | No, filament too stiff | 0 |

Referring to Table 2, it is clear from comparative Example 8 that, at high levels of liquid colourant (about 3 phr), there is a significant reduction in die head pressure, an unacceptable increase in elongation and a reduction in IV of the fibre, compared to the uncoloured fibre of Example 7.

Additionally, comparative Example 12 shows that the addition of PMDA produces a recovery of die head pressure, close to that of the uncoloured fibre of Example 7, but it is not possible to spin the fibre because the melt strength is too stiff.

However, advantageously, Examples 9 to 11 show that addition of CBC leads to appreciable die head pressure which improves the stability of fibres during spinning and minimises broken filaments.

Example 13—Preparation of Base Formulation Comprising CBC 470 g of CBC was mixed under high shear with 450 g of PTIS and 80 g of Solplus K240 (hyperdispersant) before being milled using 70% loaded 0.8 beads until the required particle size was achieved. A particle size of less than 30 μm was required for the formulations described below for example to increase shelf-life of the formulation and prevent sedimentation.

Examples 14 to 16—Preparation of Fibre Samples

Partially orientated (POY) polyethylene terephthalate (PET), 128 dtex/72f, fibre was produced by melt extruding a sample of PET (Invista 5540) that had been dried for 4 hours at 170° C. through a 30 mm extruder (L/D ratio of 24/1) fitted with a Barmag Promix AC dynamic melt mixer and a 72 hole spin pack at 285° C. and 4.5 kg/hours. The extruded fibre was drawn from the spinneret using a WINGS-POY 1500/10 winder (winder speed 3,050 m/min).

Liquid formulations injected into the Promix AC were added to the melt stream at position 2 (FIG. 1) using a Barmag Inject AC pump. The formulations were dosed through high pressure braided cable into the injector system and then mixed into the melt stream using a Promix AC (speed=30 rpm).

Example 16 uses a blend of the Examples 1 and 13 formulations.

Results are provided in Table 3

TABLE 3

| Example No | Example 1 (phr) | CBC base of Example 13 phr | Die head Pressure (bar) | Tenacity (cN/Dtex) | Elongation (%) | Spinning stability |
|---|---|---|---|---|---|---|
| Example 14 (comparative) | 0 | 0 | 149 | 2.53 | 133.2 | good |
| Example 15 (comparative) | 3.4 | 0 | 109 | 2.17 | 143.5 | poor (broken filaments) |
| Example 16 | 3.4 | 0.6 | 154 | 2.24 | 130.7 | good |

The results in Table 3 show that, in the production of finer denier fibre (1.78 denier per filament) addition of 3.4 phr of Example 1 as per Example 15 led to a significant reduction in die-head spinning pressure and tensile properties; and, additionally, the stability of the spinning process was poor, there being many broken filaments. However, results for Example 16 show that use of CBC leads to die-head pressure similar to that observed for uncoloured fibre (Example 14), improved mechanical properties and a stable spinning process, with few broken filaments.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A liquid formulation for addition to a polymeric material, said liquid formulation comprising a vehicle, an additive and carbonyl bis (1-caprolactan)) (herein referred to as CBC), wherein said vehicle has a flash point of at least 285° C., a % weight retention of greater than 85 wt % and a number average molecular weight in the range 750-1250 g/mol; and/or wherein said vehicle is a liquid at STP, has a boiling point at atmospheric pressure of 760 mmHg of greater than 300° C. and less than 1150° C. and a melting point of less than 0° C.

2. A formulation according to claim 1, wherein said vehicle includes a moiety —OCOR$^{50}$ wherein R$^{50}$ includes at least 5 —CH$_2$— moieties and includes less than 24 —CH$_2$— moieties; and the sum of the number of —CH2— moieties in all R$^{50}$ groups of moieties —OCOR$^{50}$ is at least 15.

3. A formulation according to claim 1, wherein said vehicle is selected from groups (A) to (I) defined as follows:

Group A—Pentaerythritol tri or tetra esters where the ester is derived or derivable from reaction of pentaerythritol with a carboxylic acid with a carbon chain length of C$_{12}$ to C$_{22}$;

Group B—Alkoxylated pentaerythritol tri or tetra esters where the ester is derived or derivable from the reaction of an alkoxylated pentaerythritol with a carboxylic acid with a carbon chain length of C$_{12}$ to C$_{22}$;

Group C—Dipentaerythritol penta or hexa esters where the ester is derived from the reaction of dipentaerythritol with a carboxylic acid with a carbon chain length of C$_5$ to C$_{18}$;

Group D—Alkoxylated dipentaerythritol penta or hexa esters where the ester is derived or derivable from the reaction of an alkoxylated dipentaerythritol with a carboxylic acid with a carbon chain length of C$_5$ to C$_{16}$;

Group E—Trimethylolpropane triesters where the ester is derived or derivable from the reaction of trimethylolpropane with a carboxylic acid with a carbon chain length of C$_8$ to C$_{22}$;

Group F—Alkoxylated trimethylolpropane triesters where the ester is derived or derivable from the reaction of an alkoxylated trimethylolpropane with a carboxylic acid with a carbon chain length of C$_8$ to C$_{22}$;

Group G—Esters of the tri-carboxylic acid of general formula:

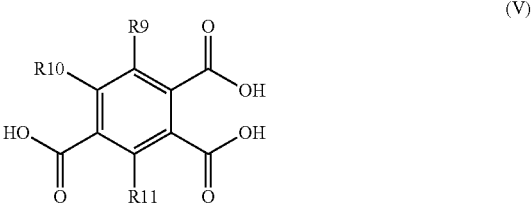

(V)

where R$^9$, R$^{10}$ and R$^{11}$ independently represent a hydrogen atom, an ester group or an optionally-substituted, preferably unsubstituted, alkyl group;

Group H—Aliphatic dicarboxylic acid species containing between 2 and 22 carbon atoms in the main structural backbone;

Group I—Fatty acid diesters of hydroxyl terminated polyester plasticisers derived from adipic acid and an alky diol; acetylated monoglycerides from hydrogenated castor oil; and ethoxylated fatty acid diesters.

4. A formulation according to claim 3, wherein said vehicle is selected from Group A.

5. A formulation according to claim 1, wherein said vehicle is of general formula

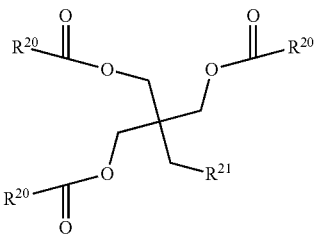

wherein each $R^{20}$ independently represents a $C_{11}$ to $C_{21}$ optionally-substituted, linear or branched, saturated or unsaturated alkyl group; and $R^{21}$ comprises a moiety $R^{20}COO-$ or an hydroxy group.

6. A formulation according to claim 1, wherein said vehicle is a pentaerythritol tetra ester.

7. A formulation according to claim 1, wherein said vehicle is pentaerythritol tetraisostearate.

8. A formulation according to claim 1, wherein said liquid formulation includes at least 2 wt % of CBC.

9. A liquid formulation for addition to a polymeric material, said liquid formulation comprising a vehicle, an additive and carbonyl bis (1-caprolactan)) (herein referred to as CBC), wherein said liquid formulation includes:
30-80 wt % of one or more vehicles;
5-60 wt % of one or more colourants;
3-25 wt % of CBC.

10. A formulation according to claim 1, wherein, in said liquid formulation, the ratio of the total weight of colourants divided by the weight of CBC is at least 2 and is less than 10.

11. A formulation according to claim 1, wherein, in said liquid formulation, said CBC includes particles having a 1 µm or greater median particle diameter.

12. A method of introducing an additive into a polymeric material, the method comprising:
(i) selecting a polymeric material;
(ii) contacting the polymeric material with said additive, carbonyl bis (1-caprolactam) (CBC) and vehicle; and
(iii) melt-processing said polymeric material;
wherein said vehicle is selected from groups A to (I) defined as follows:

Group A—Pentaerythritol tri or tetra esters where the ester is derived or derivable from reaction of pentaerythritol with a carboxylic acid with a carbon chain length of $C_{12}$ to $C_{22}$;

Group B—Alkoxylated pentaerythritol tri or tetra esters where the ester is derived or derivable from the reaction of an alkoxylated pentaerythritol with a carboxylic acid with a carbon chain length of $C_{12}$ to $C_{22}$:

Group C—Dipentaerythritol penta or hexa esters where the ester is derived from the reaction of dipentaerythritol with a carboxylic acid with a carbon chain length of $C_5$ to $C_{18}$;

Group D—Alkoxylated dipentaerythritol penta or hexa esters where the ester is derived or derivable from the reaction of an alkoxylated dipentaerythritol with a carboxylic acid with a carbon chain length of $C_5$ to $C_{16}$;

Group E—Trimethylolpropane triesters where the ester is derived or derivable from the reaction of trimethylolpropane with a carboxylic acid with a carbon chain length of $C_8$ to $C_{22}$;

Group F—Alkoxylated trimethylolpropane triesters where the ester is derived or derivable from the reaction of an alkoxylated trimethylolpropane with a carboxylic acid with a carbon chain length of $C_8$ to $C_{22}$;

Group G—Esters of the tri-carboxylic acid of general formula:

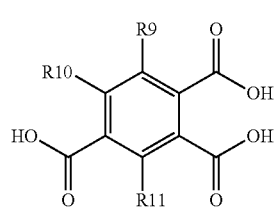

(V)

where $R^9$, $R^{10}$ and $R^{11}$ independently represent a hydrogen atom, an ester group or an optionally-substituted, preferably unsubstituted, alkyl group;

Group H—Aliphatic dicarboxylic acid species containing between 2 and 22 carbon atoms in the main structural backbone;

Group I—Fatty acid diesters of hydroxyl terminated polyester plasticisers derived from adipic acid and an alky diol; acetylated monoglycerides from hydrogenated castor oil; and ethoxylated fatty acid diesters.

13. A formulation according to claim 1, wherein said liquid formulation includes:
40-70 wt% of pentaerythritol tetraisostearate;
20-50 wt% of one or more colourants;
3-20 wt% of CBC.

14. A liquid formulation according to claim 9, wherein said vehicle is selected from groups (A) to (I) defined as follows:

Group A—Pentaerythritol tri or tetra esters where the ester is derived or derivable from reaction of pentaerythritol with a carboxylic acid with a carbon chain length of $C_{12}$ to $C_{22}$;

Group B—Alkoxylated pentaerythritol tri or tetra esters where the ester is derived or derivable from the reaction of an alkoxylated pentaerythritol with a carboxylic acid with a carbon chain length of $C_{12}$ to $C_{22}$;

Group C—Dipentaerythritol penta or hexa esters where the ester is derived from the reaction of dipentaerythritol with a carboxylic acid with a carbon chain length of $C_5$ to $C_{18}$;

Group D—Alkoxylated dipentaerythritol penta or hexa esters where the ester is derived or derivable from the reaction of an alkoxylated dipentaerythritol with a carboxylic acid with a carbon chain length of $C_5$ to $C_{16}$;

Group E—Trimethylolpropane triesters where the ester is derived or derivable from the reaction of trimethylolpropane with a carboxylic acid with a carbon chain length of $C_8$ to $C_{22}$;

Group F—Alkoxylated trimethylolpropane triesters where the ester is derived or derivable from the reaction of an alkoxylated trimethylolpropane with a carboxylic acid with a carbon chain length of $C_8$ to $C_{22}$;

Group G—Esters of the tri-carboxylic acid of general formula:

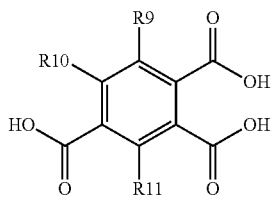

(V)

where $R^9$, $R^{10}$ and $R^{11}$ independently represent a hydrogen atom, an ester group or an optionally-substituted, preferably unsubstituted, alkyl group;

Group H—Aliphatic dicarboxylic acid species containing between 2 and 22 carbon atoms in the main structural backbone;

Group I—Fatty acid diesters of hydroxyl terminated polyester plasticisers derived from adipic acid and an alky diol; acetylated monoglycerides from hydrogenated castor oil; and ethoxylated fatty acid diesters.

15. A formulation according to claim 14, wherein said liquid formulation includes 30-80 wt % of a pentaerythritol tetra ester.

16. A formulation according to claim 14, wherein said liquid formulation includes:
 40-70 wt % of pentaerythritol tetraisostearate;
 20-50 wt % of one or more colourants;
 3-20 wt % of CBC.

17. A formulation according to claim 15, wherein, in said liquid formulation, the ratio of the total weight of colourants divided by the weight of CBC is at least 2 and is less than 10; and, in said liquid formulation, said CBC includes particles having a median particle diameter of between ≥1 μm and ≤200 μm.

18. A formulation according to claim 1, wherein said liquid formulation includes less than 25 wt % of CBC.

19. A formulation according to claim 1, wherein, in said liquid formulation said CBC includes particles having a median particle diameter 200 μm or less.

\* \* \* \* \*